Feb. 28, 1933.  L. H. KAI ET AL  1,899,198
CONTROL ROD MOUNTING
Filed June 12, 1930
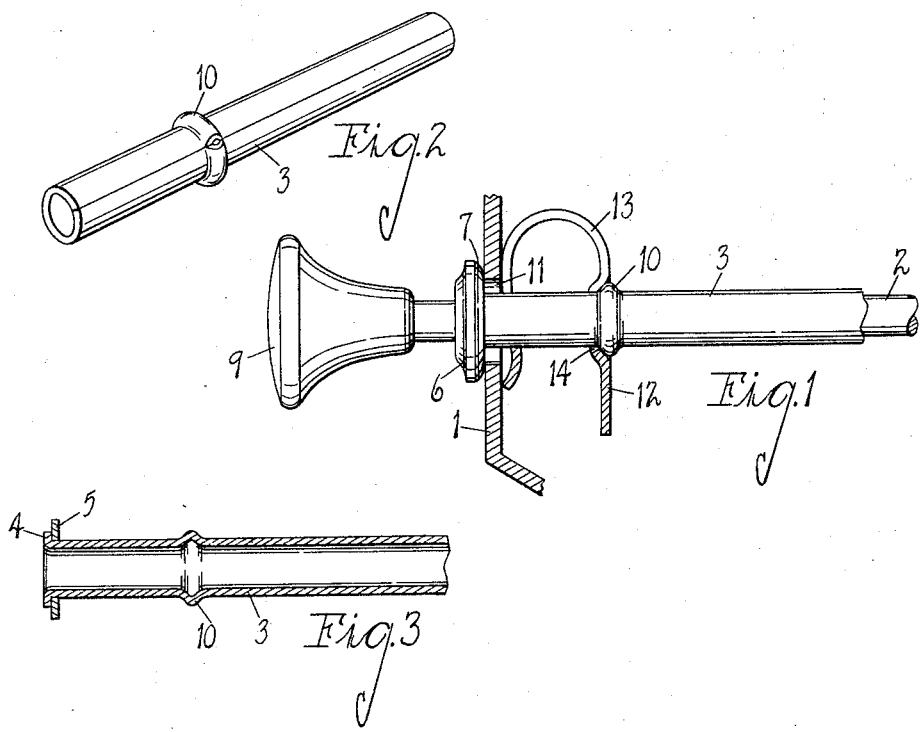
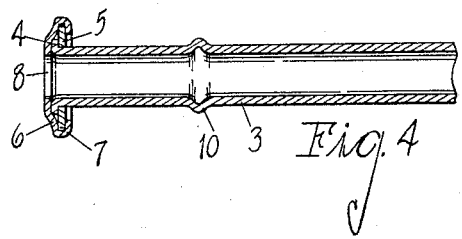
INVENTOR
Louis H. Kai
BY Herman Weber
Chappell Earl
ATTORNEYS Patented Feb. 28, 1933

1,899,198

UNITED STATES PATENT OFFICE

LOUIS H. KAI AND HERMAN WEBER, OF KALAMAZOO, MICHIGAN, ASSIGNORS TO SHAKESPEARE PRODUCTS COMPANY, OF KALAMAZOO, MICHIGAN

CONTROL ROD MOUNTING

Application filed June 12, 1930. Serial No. 460,575.

The main object of this invention is to provide a mounting for control rods such as are employed on remote controls in motor vehicles and the like which is neat and attractive in appearance and at the same time is economical in structure.

Objects pertaining to details and economies of our invention will definitely appear from the description to follow. The invention is defined in the claims.

A structure which embodies the features of our invention is clearly illustrated in the accompanying drawing in which:

Fig. 1 is a fragmentary view showing our improved control mounting in operative relation to an instrument board of a motor vehicle.

Fig. 2 is a perspective view illustrating one of the steps in the manufacture of our improved control rod mounting.

Fig. 3 is a fragmentary sectional longitudinal section illustrating another step in the manufacture of our improved control rod mounting.

Fig. 4 is a fragmentary longitudinal section illustrating another step and the completed mounting.

In the accompanying drawing, 1 represents the instrument board of a motor vehicle and 2 the control rod. Our improved control rod mounting comprises a tubular body 3 having an out-turned flange 4 at one end, a collar 5 being arranged on the tubular body at the inner side of this flange as shown in Figs. 3 and 4. The headpiece 6 embraces this flange and the collar, the edge 7 of the head being folded over the flange. The head is provided with a bore 8 alined with the bore of the tubular body to receive the control rod which is provided with a fingerpiece 9 at its outer end.

The tubular body is provided with an annular bead-like rib 10 spaced from its outer end or head.

The control rod mounting is arranged through the hole 11 in the instrument board and is retained therein by means of a U-shaped fastening member 12 having a slot 13 in its bight end extending into its arms, one of the arms having a seat 14 adapted to receive the rib 10. This provides an effective retaining means without the necessity for threaded parts.

Our improved mounting may be very economically produced, the first step being to roll the bead into the piece of sheet metal, and then roll this piece of sheet metal into a tube as shown in Fig. 2. The next step is to slip the collar over this tube and form the flange 4 as shown in Fig. 3. The next operation is to apply the cap-like head, folding its edges over the collar. This not only provides an attractive finish but the collar is held in engagement with the flange and serves as a reinforcing means for the tube, that is, it prevents its opening up at the joint, so all of the parts may be of very light material.

Some of the functions of the collar 5 are: (1) The collar serves to hold the body in tubular form in assembling the head and forming the flange; (2) the collar constitutes a filler and former for the head; (3) the collar reinforces the body and the head. Some of the functions of the flange 4 are: (1) The flange reinforces the end of the tubular body member and helps to prevent it from resuming its flat sheet meal form; (2) the flange constitutes a support and filler for the head which is of relatively thin or light gauge sheet metal; (3) the flange constitutes a backing for the collar preventing it from slipping off the end of the tube. The head not only provides an ornamental appearance for the end of the tubular body, but it also supports the collar and flange in assembled relation and holds the body in tubular form when the collar is omitted and assists the collar in this function if the latter is present. The purpose of the entire end structure is to provide an annular shoulder or abutment for engaging the outside of the panel 1 at the opening through which the tubular body extends. The washer-like collar is used in the combination to encompass the rolled tubular sheet metal body during assembly and afterwards and to provide a skeleton and forming member for the head which is spun over the collar to clamp it, the head, and the flange in assembled relation. The collar, flange, for improving the structure and its assembly, the function of each element being enumerated above.

Having thus described our invention what we claim as new and desire to secure by Letters Patent is:

1. A mounting for control rods and the like, comprising a tubular sheet metal body of substantially constant diameter having a longitudinal seam and an out-turned flange at its outer end and an annular reinforcing bead-like rib substantially spaced from said flange, a washer-like collar loosely embracing said body at the rear of said flange and abutting said flange, and a head of thin sheet metal engaging and embracing said flange and collar and having its edge folded over the edge of said collar, said head being in substantial contact with said flange and collar, whereby to clamp said head, collar and flange in assembled relation.

2. A mounting for control rods and the like, comprising a tubular sheet metal body of substantially constant diameter having an out-turned flange at its outer end, a flat washer-like collar loosely embracing said body at the rear of said flange and abutting said flange, and a head engaging and embracing said flange and collar and having its edge folded over the edge of said collar, said head being in substantial contact with said flange and collar, whereby to clamp said head, collar and flange in assembled relation.

In witness whereof we have hereunto set our hands.

LOUIS H. KAI.
HERMAN WEBER.